July 2, 1940.  E. P. BROWN  2,206,596
BAG STRIP LINER
Filed March 7, 1938   2 Sheets-Sheet 1
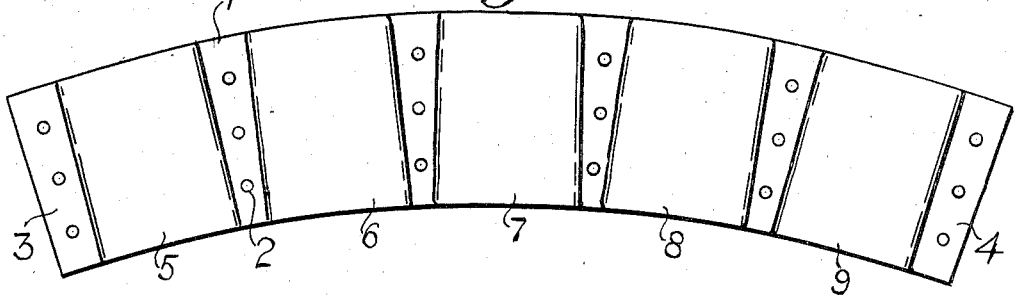
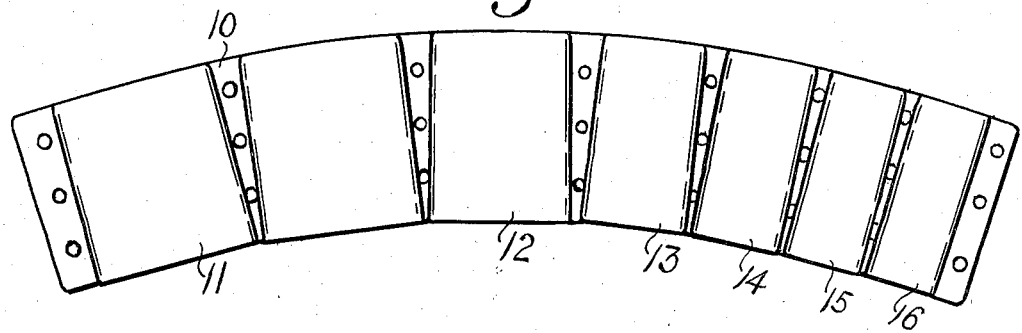
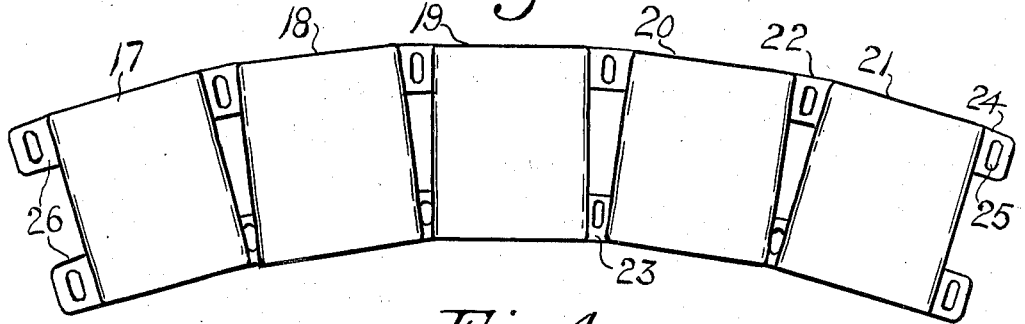
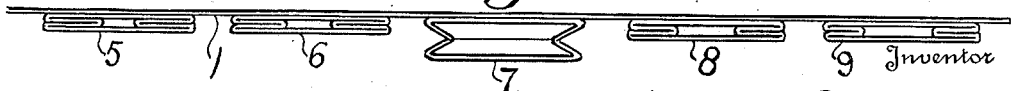
Inventor
Edwin P. Brown.
By Edwin Guthrie
Attorney July 2, 1940. E. P. BROWN 2,206,596
BAG STRIP LINER
Filed March 7, 1938 2 Sheets-Sheet 2
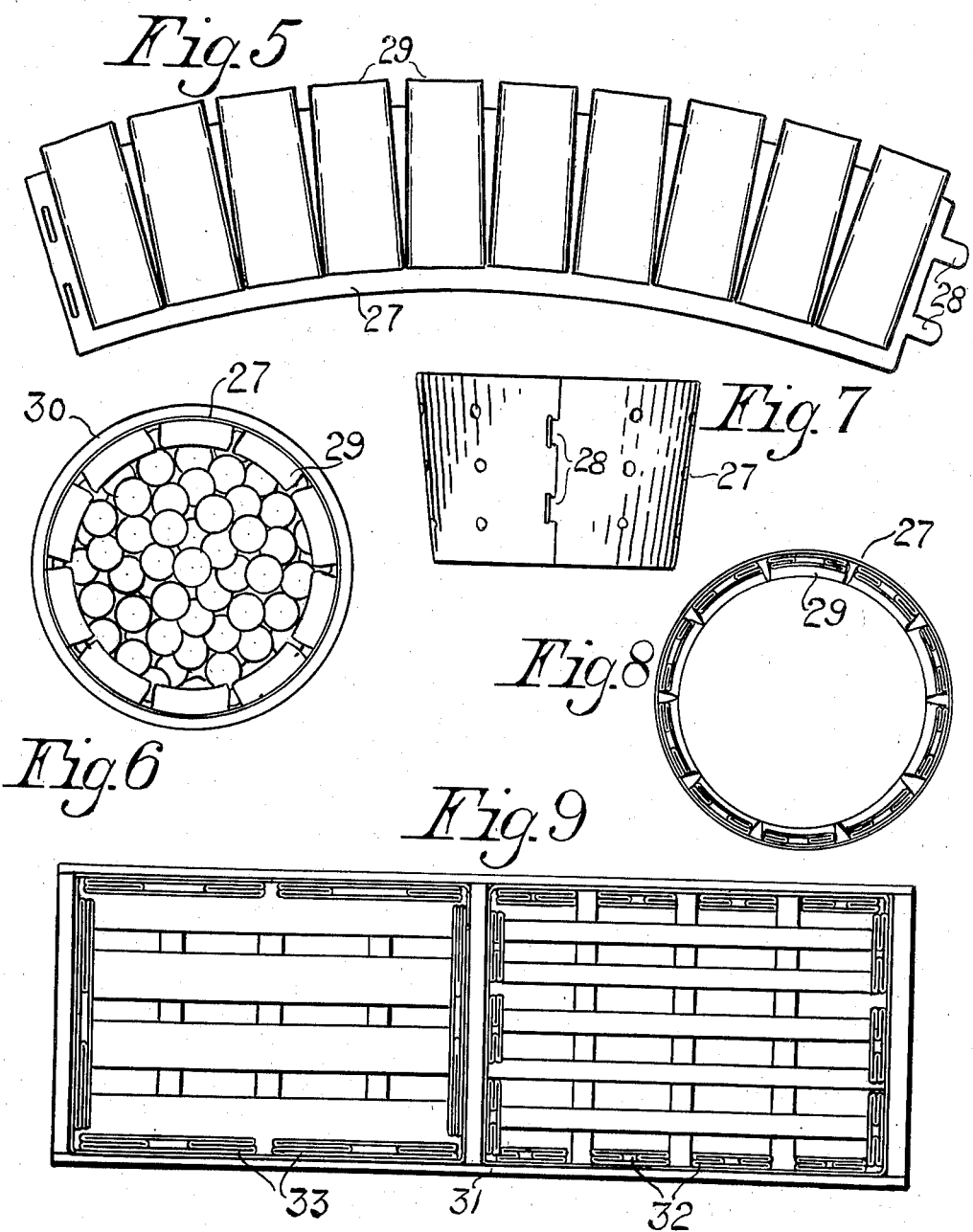

Patented July 2, 1940

2,206,596

UNITED STATES PATENT OFFICE 2,206,596

BAG STRIP LINER

Edwin P. Brown, Murfreesboro, N. C.

Application March 7, 1938, Serial No. 194,461

1 Claim. (Cl. 217—3)

This invention relates to liners such as are ordinarily placed in wooden baskets, boxes or like receptacles used to contain fruit exposed for sale or transportation in bulk. As customarily formed the baskets are of tapering shape similar to the frustum of a cone, and the liners are fashioned to correspond in configuration with the inside surface of the baskets.

The object of this invention is the construction of a liner of the usual form and material for protecting fruit in customary shipping baskets, the liner being provided on its inner surface with a series of paper bags individually removable for dispensing portions of the fruit while the liner remains in the basket.

An additional object is to construct a liner which is sufficiently strong to hold the fruit or vegetables in position during packaging, when that is required, and is of sufficient substance to cushion the fruit or the like adequately against the walls of the basket or box, while possessing enough flexibility to adjust itself to the irregularities of the basket or other receptacle interiorly, and to the distortion of the package in the course of shipment.

A still further object is to produce a liner which will serve as a medium through which advertising matter may be disseminated to the ultimate users of the fruits or vegetables packed in the container.

Likewise, it is an object of the invention to furnish a liner that includes means for protecting the outermost or edge portions of the contents of the basket against surface bruising or other damage by the cover of the basket.

By the accompanying drawings the various structures and arrangements of the features of this invention are illustrated.

Fig. 1 represents a front view of the invention showing all parts assembled.

Fig. 2 is a like front view of a modified form of the invention.

Fig. 3 illustrates a modified form of the means for connecting the bags in arcuate series.

Fig. 4 is an edge view of the parts set out in Fig. 1, showing one of the bags partly opened.

Fig. 5 presents another modification of the invention showing all parts thereof assembled.

Fig. 6 represents a top view of a basket filled with fruit, this invention being applied to the basket and the top ends of the bags turned over inwardly with respect to the basket to protect the edge pieces of the fruit contents.

Fig. 7 shows the usual truncated conical form of the liner when its ends are secured together.

Fig. 8 illustrates a top view of a liner with its ends joined in circular form showing the series of bags in flattened condition.

Fig. 9 is a top view of a fruit shipment box or crate, disclosing two forms of this invention applied thereto, all parts assembled.

Throughout the drawings and the following description the same number refers to the same part.

In Fig. 1 a connecting member 1 having spaced portions provided with openings or perforations 2, has the ends 3 and 4 by which the member may be secured in truncated conical shape by pasting the ends together. The bags 5, 6, 7, 8 and 9 are secured to the connecting member 1 by small spots of adhesive on the back walls of the bags, enabling each bag to be pulled off separately when wanted. The perforated portions of the member lie between the bags as shown.

In Fig. 2 the connecting member 10 having as before the perforated ends and spaced perforated portions between the bags is provided with bags of different sizes, 11, 12, 13, 14, 15 and 16. It may be here stated that the bags do not necessarily have to be as long as the connection sheet is wide, but they are customarily so constructed.

In Fig. 3 the bags 17, 18, 19, 20 and 21 of substantially the same size as presented in Fig. 1, are connected by the top and bottom straps or tabs 22 and 23. The projecting ends 24 and 26 of the connecting means have the openings such as the slot 25 shown through the end 24.

In Fig. 4 one bag 7 is shown partly opened for purposes of illustration herein.

Considering Fig. 5, it will be noted that the connecting member 27 is provided with end tabs 28 in order that the ends of the member may be secured together as previously explained, and that the upper ends of the bags 29 project beyond the curving top of the connecting arcuate member 27.

Fig. 6 shows the extended tops of the bags set out in Fig. 5 turned over the fruit near the outer edge of the basket 30 to protect the fruit if the cover of the basket is roughly applied.

Fig. 7 illustrates the usual truncated conical shape of the liner, side view, when its ends are joined. Fig. 8 is a top view of a liner with its ends joined, the liner being that set out in Fig. 5 with the tops of the bags extending upwardly before being turned over the fruit as shown in Fig. 6.

It is believed to be within the scope and purview of this invention to apply the liner so constructed to a fruit transport box or crate 31, and it will be noted that the bags 32 may differ in size from bags 33.

It is not intended to limit this invention to the number, or size of the bags which each liner may have, nor is it intended to restrict the rights herein to any special means for securing the bags one to the other, so long as they are adapted to be individually detached. It is thought to be clear that those features may be readily changed without materially departing from this invention. Equally, any means for constructing the bag connections so that the same may be easily torn is sought to be covered by this specification. Further, this invention may be constructed by attaching the bags in series to the ordinary liners of paper material now in common use.

Having now described this invention and the manner of its use, I claim:

A container for shipping fruit and the like having a liner including a series of paper bags carried by the liner in detachable relation and arranged in the container on the inside surface of the liner whereby the fruit is protected by the bags and the liner, and the bags are detachable separately for dispensing the fruit, a part of each bag being extended beyond the liner and adapted to be bent inwardly over the fruit to protect the same below the cover of the container.

EDWIN P. BROWN.